C. H. BOUCHER.
VARIABLE SPEED GEARING.
APPLICATION FILED DEC. 8, 1911.
1,035,076.
Patented Aug. 6, 1912.
3 SHEETS—SHEET 1.
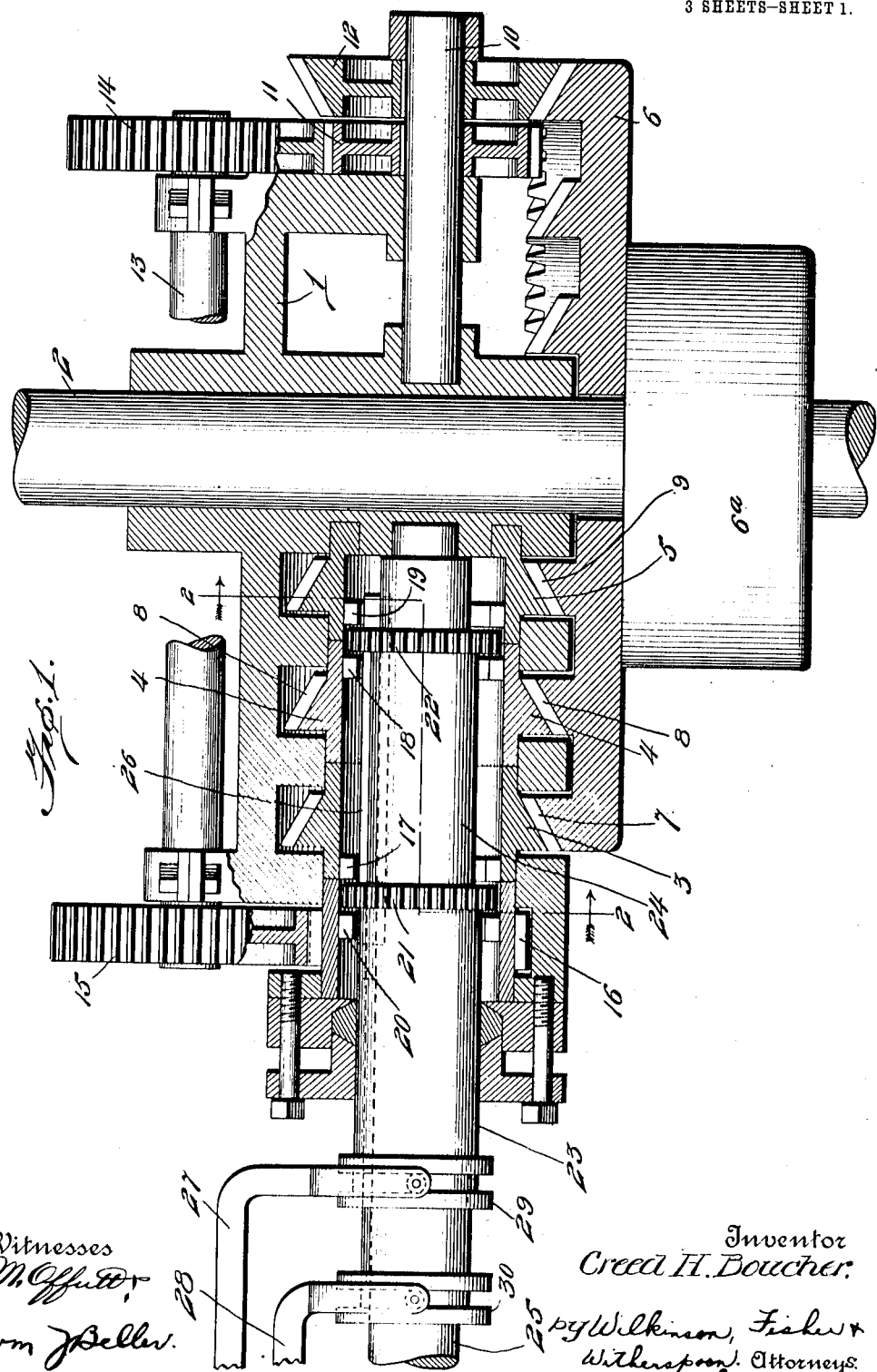
Witnesses
B. M. Offutt
Edwin J. Beller
Inventor
Creed H. Boucher
by Wilkinson, Fisher & Witherspoon, his Attorneys

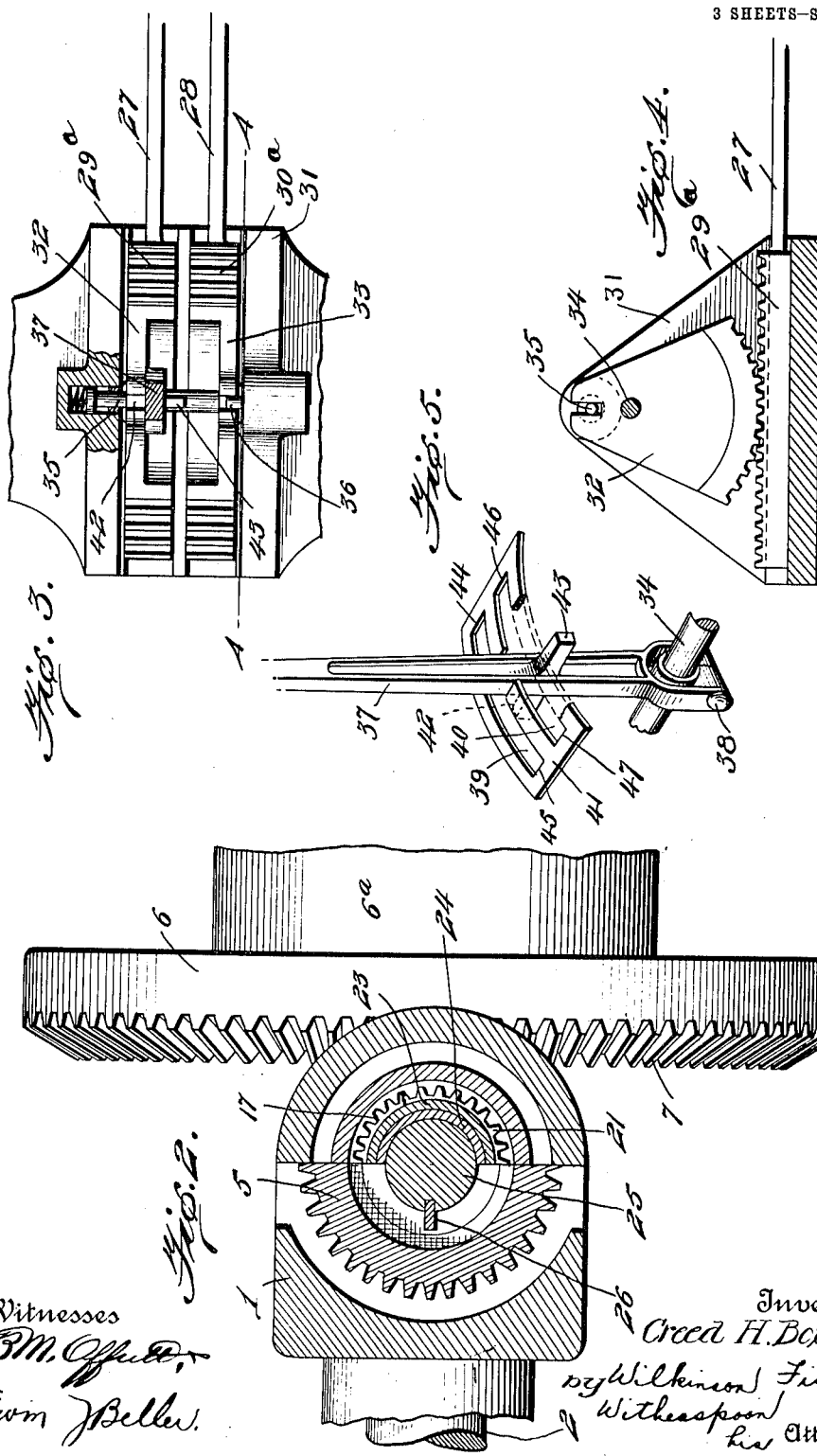

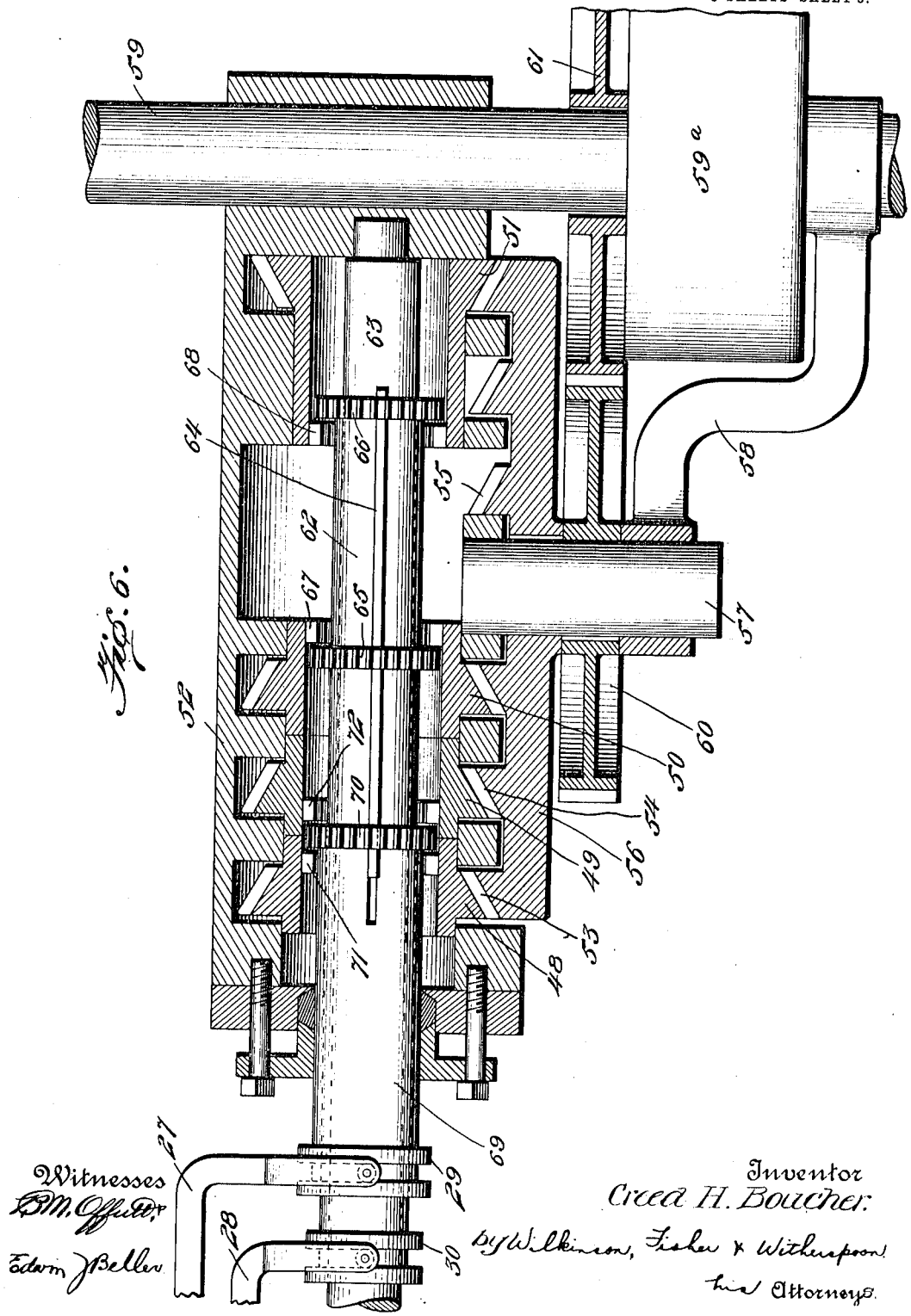

UNITED STATES PATENT OFFICE.

CREED HAYMOND BOUCHER, OF THE UNITED STATES NAVY.

VARIABLE-SPEED GEARING.

1,035,076.  Specification of Letters Patent.  Patented Aug. 6, 1912.

Application filed December 8, 1911. Serial No. 664,638.

*To all whom it may concern:*

Be it known that I, CREED H. BOUCHER, ensign, United States Navy, a citizen of the United States, at present attached to the U. S. S. *Des Moines*, have invented certain new and useful Improvements in Variable-Speed Gearing; and I do hereby declare the following to be a full, clear, and exact description of the invention, such as will enable others skilled in the art to which it appertains to make and use the same.

My invention relates to variable speed mechanisms especially adapted to motor vehicles, and it consists in the constructions, combinations, and arrangements herein described and claimed.

An object of my invention is to provide an improved variable speed mechanism, in which any of the speeds can be thrown in without passing through the others, and adapted to eliminate the troublesome and injurious shocks occurring in previous constructions.

A further object of my invention is to provide a simple and compact variable speed mechanism which will be practically noiseless in operation, and adapted to provide a steady drive with a minimum of wear under all practical conditions.

In the accompanying drawings, forming a part of this application and in which similar reference symbols indicate corresponding parts in the several views:—Figure 1 is a central sectional view, partly in elevation, illustrating one embodiment of my invention with the parts in neutral position; Fig. 2 is a section on the line 2—2 of Fig. 1; Fig. 3 is a detail plan view, partly broken away, showing the control rods and their actuating mechanism; Fig. 4 is a sectional elevation on the line 4—4 of Fig. 3; Fig. 5 is a detail perspective view, showing the operating lever and H-plate; and, Fig. 6 is a view similar to Fig. 1, illustrating a modified construction.

Referring to the drawings, 1 indicates a casing, in which are journaled a driven shaft or a rear axle 2 and a series of independent gears 3, 4 and 5; a multiple gear wheel 6 being rigidly secured to any usual differential $6^a$ for driving the axle 2, with its several gear faces 7, 8 and 9 meshing, respectively, with said gears 3, 4 and 5. A stub shaft 10 is journaled in the frame 1 and carries gears 11 and 12, the latter of which meshes with said gear face 7 of the multiple wheel 6.

A counter-shaft 13, journaled in the frame 1, carries a gear 14 in mesh with said gear 11 and a gear 15 meshing with a gear 16 journaled in the frame.

The gears 3, 4, 5 and 16 are provided with suitable locking means, such as internal projections 17, 18, 19 and 20, for interlocking engagement by coöperating means, such as projections 21 and 22. The projections 21 and 22 are carried, respectively, by sleeves 23 and 24 slidably mounted on a drive shaft 25 by a spline 26.

Control rods 27 and 28 are shown engaging grooved collars 29 and 30 on the sleeves 23 and 24 for shifting said sleeves axially on the drive shaft 25.

The rods 27 and 28 are provided with rackheads $29^a$ and $30^a$ slidably mounted in a guide frame 31 in mesh with toothed segments 32 and 33, which latter are journaled at 34 in said frame. Suitable means, such as spring-pressed latches 35 and 36, are provided for automatically locking said segments in their neutral position for maintaining the projections 21 and 22 in their inoperative disengaged positions, as shown in Fig. 1. A shift lever 37 is pivoted at 38 to the journal 34 of the toothed segments, for permitting swing of said lever in either of the slots 39 or 40 of an H-plate 41; said lever being provided with lugs 42 and 43 adapted to actuatingly engage either of the segments 32 and 33 and automatically release the latch thereof, for permitting independent actuation of either segment.

As shown in Fig. 3, the lever 37 has been swung from its central position to engage the segment 32, thereby automatically releasing the latch 35 for permitting actuation of said segment to shift the control rod 27; the segment 33 being positively locked in neutral position by the latch 36 during such shifting of the segment 32.

From the above description, it will be clear that when the lever 37 is swung to its extreme forward position at 44 in the slot 39, the rod 27 will shift the outer sleeve 23 to cause interengagement of the projections 21 and 20; whereby the rear axle 2 will be driven in a reverse direction through the intermediary of the meshing gears 15 and 16, counter-shaft 13, meshing gears 14 and 11, stub shaft 10 and meshing gears 12 and 6.

When the lever 37 is swung to its extreme rear position at 45 in the slot 39, the rod 27 will shift the outer sleeve 23 to cause interengagement of the projections 21 and 17; whereby the rear axle 2 will be driven in a forward direction at the first or lowest speed, through the intermediary of the meshing gears 3 and 7.

When the lever 37 is swung to its extreme forward position at 46 in the slot 40, the rod 28 will shift the inner sleeve 24 to cause interengagement of the projections 22 and 18, whereby the axle 2 will be driven in a forward direction at the second or intermediate speed, through the intermediary of the meshing gears 4 and 8. Similarly, when the lever 37 is swung to its extreme rear position at 47 in the slot 40, the rod 28 will cause interengagement of the projections 22 and 19, whereby the axle 2 will be driven in a forward direction at the third or highest speed, through the intermediary of the meshing gears 5 and 9.

My invention, thus, provides a strong and compact variable speed mechanism, in which any of the speeds can be thrown in without passing through the others, and in which accidental simultaneous engagement of two change gears is positively prevented.

It will be noted that the multiple gear wheel 6 is adapted to give a maximum arc of contact with the meshing gears 3, 4, 5 and 12, and that, since said gears are constantly in mesh, they can be formed with the modern accurate tooth contours; thereby providing a maximum of strength and eliminating the injurious shocks and excessive wear caused by back lash and irregular driving contact in previous variable speed gears.

Fig. 6 illustrates a modified construction, in which a series of gears 48, 49, 50 and 51 are journaled in a frame 52, in mesh with the gear faces 53, 54 and 55 of a multiple gear wheel 56. The wheel 56 is secured to a stub shaft 57 journaled in a bracket 58 on the frame 52, and a driven shaft or rear axle 59 is shown journaled in said frame and bracket; intermeshing gears 60 and 61 being secured respectively to said shaft 57 and to any usual differential 59ª for driving the shaft 59. An inner sleeve 62 is slidably secured to a drive shaft 63 by a spline 64, in the previously described manner, and carries projections 65 and 66 adapted for engagement with internal projections 67 and 68 on the gears 50 and 51. An outer sleeve 69 is slidably mounted on the drive shaft by said spline 64 and carries projections 70 for engagement with the internal projections 71 and 72 of the gears 48 and 49. The outer and inner sleeves 69 and 62 are shifted by the previously described control-rod mechanism, and it will be clear that when the shift lever 37 is at its positions 44, 45, 46 and 47, the rear axle 59 will be driven in a forward direction at the first or lowest speed, driven forwardly at the second or intermediate speed, driven in a reverse direction, and driven forwardly at the third or highest speed, respectively. This modification embodies the principles of my previously described construction, and is adapted for advantageous use under all practical conditions.

I have shown my invention especially adapted for use with motor vehicles, but it will be obvious that it is equally adapted for advantageous use in other connections and that changes could be made within the spirit and scope of my invention.

I claim:—

1. In a variable speed gearing, the combination of a casing, a drive shaft, inner and outer sleeves telescopingly mounted on said shaft and extending within said casing, a packing on said casing for said outer sleeve, a series of gears journaled in said casing, coöperating locking means on said sleeves and gears, a multiple gear wheel meshing with the respective gears of said series, and actuating means engaging said inner and outer sleeves.

2. In variable speed gearing, the combination of a casing, a drive shaft extending therein, a bearing in said casing for the end of said shaft, inner and outer sleeves telescopingly mounted on said shaft and extending within said casing, a packing on said casing for said outer sleeve, a series of gears journaled in said casing, coöperating locking means on said sleeves and gears, a multiple gear wheel meshing with the respective gears of said series, and actuating means engaging said inner and outer sleeves externally of said casing.

3. In a variable speed gearing, the combination of a casing, a drive shaft, inner and outer sleeves telescopingly mounted on said shaft and extending within said casing, a spline on said shaft extending through said inner sleeve into said outer sleeve, a packing on said casing for said outer sleeve, a series of gears journaled in said casing, coöperating locking means on said sleeves and gears, a multiple gear wheel meshing with the respective gears of said series, and actuating means engaging said inner and outer sleeves externally of said casing.

In testimony whereof, I affix my signature, in presence of two witnesses.

CREED HAYMOND BOUCHER.

Witnesses:
W. H. D. MARR,
PAUL MUNTER.